United States Patent [19] [11] 3,861,973
Koch [45] Jan. 21, 1975

[54] POLYAMIDE HOSE AND PREPARATION THEREOF
[75] Inventor: Robert B. Koch, Reading, Pa.
[73] Assignee: Rilsan Corporation, Glen Rock, N.J.
[22] Filed: Feb. 27, 1973
[21] Appl. No.: 336,387

[52] U.S. Cl.............. 156/143, 117/18, 117/21, 138/123, 138/125, 138/129, 156/149, 156/172, 156/244, 156/279, 156/305, 156/306, 156/309
[51] Int. Cl............................................. B32b 1/08
[58] Field of Search ........... 156/148, 149, 244, 143, 156/172, 279, 305, 306, 307, 309, 283, 308, 314; 138/123, 124, 125, 126, 132, 129; 264/178 R, 183, 184; 117/18, 21

[56] References Cited
UNITED STATES PATENTS
2,977,839  4/1961  Koch ................................ 156/149
3,253,618  5/1966  Cook ................................ 156/149
3,334,165  8/1967  Koch ................................ 156/149
3,682,201  8/1972  Atwell et al. ..................... 156/149
3,773,089  11/1973 Chudgar .......................... 156/149

Primary Examiner—Charles E. Van Horn
Assistant Examiner—F. Frisenda, Jr.

[57] ABSTRACT

A polyamide hose is provided including a process for the preparation thereof. In the process, a polyamide or copolyamide tubing is contacted with a resorcinol solution and the treated tubing is then reinforced with a synthetic or natural fiber followed by subjecting the reinforced tubing to an elevated temperature of at least about 150°F.

26 Claims, 3 Drawing Figures

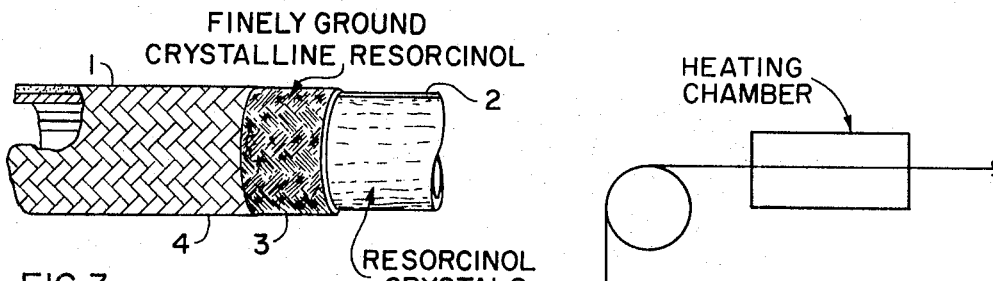
FIG. 3
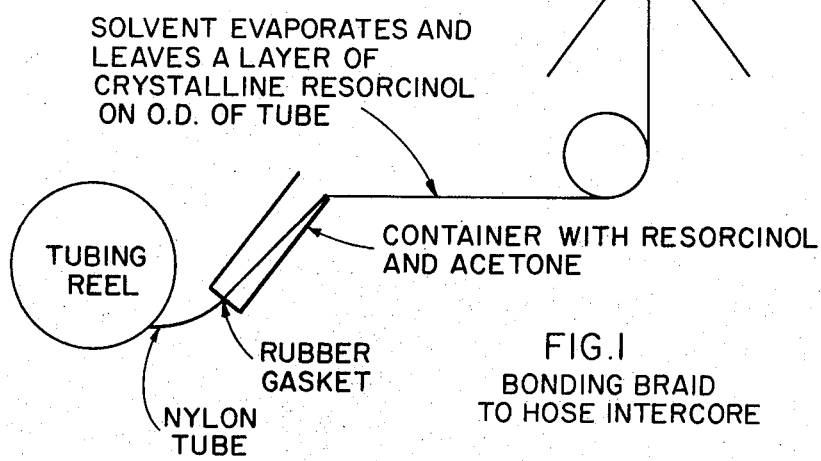
FIG. 1
BONDING BRAID
TO HOSE INTERCORE
FIG. 2
BONDING COVER
TO BRAID
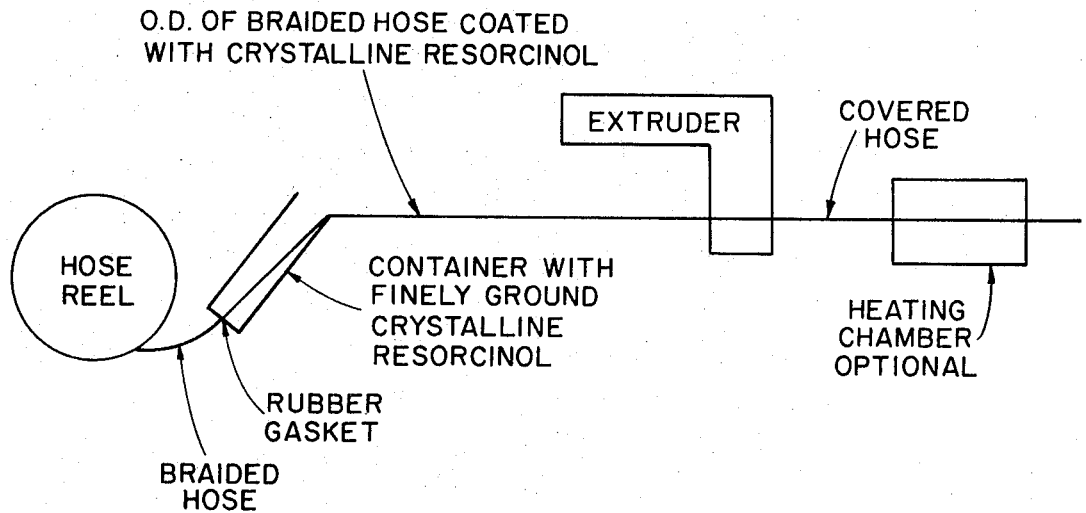

POLYAMIDE HOSE AND PREPARATION THEREOF

BACKGROUND OF THE INVENTION

Various procedures have been described in the literature for producing an all-nylon textile-reinforced plastic hose by plasticizing the surface of nylon tubing and then applying to the plasticized surface of the plastic hose, while plasticized, a braided nylon textile reinforcement. The reinforced tubing is then passed through a water bath so as to remove the plasticizing agent, the resulting material is then subjected to heat and this is followed by immediately extruding a nylon covering over the plasticized surface of the braided material. This procedure is disclosed in Koch U.S. Pat. No. 2,977,839.

Atwell U.S. Pat. No. 3,682,201 discloses a similar textile-reinforced all polymeric hose which is considered to be as good as the hose disclosed in the aforesaid Koch Patent. In said U.S. Pat. No. 3,682,201, the procedure used is very similar to that described in the Koch patent mentioned supra in that one or more circular knitted layers of thermoplastic, such as, for example, nylon, textile reinforcing elements are disposed around a thermoplastic (e.g. nylon) innertube. The knitted layer adjacent the inner tube is fused to the outer surface of the tube at the inner face therebetween and the succeeding knitted layers are fused to one another. The fusion is preferably achieved by plasticizing the thermoplastic components to the be bonded together by using a resorcinol-water solution or other agent capable of plasticizing the thermoplastic material of the components to be bonded together, holding the components in contact with one another and relatively immobilized while they are so plasticized until fusion bonding takes place. The plasticizing agent is then removed, usually by use of a solvent and the plasticizing action is thereby stopped.

In the procedures described in both the Koch and Atwell et al. patents, the solvation or plasticization of the tubing is required prior to the applying of the fiber. Thus, the nylon which is being solvated has a preference for resorcinol and consequently, there is a continually changing concentration of the solvating bath. As a result, it is extremely difficult to control the procedure. Further, in the aforesaid prior procedures, the solvated surface is very pliable and is pushed up through the interstices of the fiber and this can cause serious deterioration of the fiber through excess solvation of the fiber especially when the fiber is nylon.

SUMMARY OF THE INVENTION

In accordance with the present invention, a method has been developed for preparing a hose construction wherein a polyamide or copolyamide tubing is treated with a resorcinol solution, the treated tubing is then reinforced with a synthetic or natural fiber followed by subjecting the reinforced tubing to a temperature of at least 150°F.

The resulting tubing is especially adapted for pressure service such as, for example, in hydraulic, pneumatic, refrigeration, air conditioning and other like applications.

In the present process, crystalline resorcinol is dissolved in a suitable solvating agent such as, water, acetone, alcohol, and the like and then applied as a thin coating as, for example, by spraying or by immersion of the polyamide tubing in the solvating agent. A suitable reinforcing material which is either a synthetic or natural fiber is then wrapped, braided or helically wound around the tubing so treated. The reinforced structure is then subjected to an elevated temperature, that is, a temperature in excess of about 150°F thereby causing solvation of the polyamide tubing to produce the desired product.

Suitable polyamide tubings include, for example, nylon 6, nylon 66, polyamides of ω-aminoundecanoic acid (nylon 11), nylon 12, and the like, including mixtures of such polyamides. Nylon 11 tubing is considered to be one of the more suitable tubing materials because of its characteristics of greater toughness and extremely high resistance to flex fatigue.

It has been found that prior to contacting the polyamide tubing with the resorcinol solution, said tubing should be cleaned so as to prevent contamination of said resorcinol solution. Suitable cleaning agents include, for example, various alcohols such as methanol, ethanol, and the like.

In the present process, crystalline resorcinol is dissolved in a suitable solvating agent such as, for example, water, acetone, lower alkanols such as, for example, methanol, ethanol, and the like, or mixtures thereof. When the resorcinol is dissolved in an alcohol solution, as little as about 20% or as much as about 75% of the alcohol solution can be used and suitably, equal amounts by weight, of resorcinol and methanol. Another suitable solvating agent is a 25% aqueous and a 25% alcohol solution. It is desirable to add, to the solvating agent, a wetting agent such as Triton X-100 manufactured by E. I. Du Pont or Tergitol, manufactured by the Union Carbide Corporation. However, such a wetting agent is unnecessary when alcohol such as methanol or ethanol is used as the solvating agent.

The polyamide tubing such as, for example, nylon 11 tubing, is immersed and passed through a resorcinol bath leaving on the tubing, a thin layer of the solvated resorcinol. It is generally desirable that the tubing should be withdrawn in a vertical direction. The thin film which is developed on the surfaces of the tubing material can be dried suitably by warm air blast at a temperature varying between about 75 and about 120°F. When an alcohol is used as the solvating agent for resorcinol, the drying time is considerably reduced and particularly when methanol is used, because of its low boiling point, the methanol will evaporate rapidly. Consequently, methanol is deemed to be one of the more suitable solvating agents for resorcinol. Following the drying step, a thin layer of crystalline resorcinol is left on the surface of the polyamide tubing.

A reinforcing member is then applied to the polyamide tubing by conventional procedures such as, for example, by wrapping, braiding or helically winding said reinforcing member around the tubing. Suitable reinforcing materials include, for example, natural fibers such as cotton, or synthetic materials such as, for example, rayon, polyesters, that is, poly (ethylene terephthalate) such as "Dacron" (trademark) or "Terylene" (trademark) vinyl resins such as, for example, polyvinyl chloride or copolymers of vinyl chloride and vinyl acetate such as "vinyon", acrylic plastics such as those which are largely based on acrylonitrile, such as, for example, "Dynel" (trademark), "Orlon" (trademark), "Acrilan" (trademark) and "Creslan" (trademark), vinylidene chloride polymers and copolymers such as "Saran" (trademark), polyolefins such as polypropylene and the like, as well as mixtures of the aforesaid natural and synthetic fibers. There can also be used, as reinforcing material, various polyamides such as nylon 6 (polyhexamethylene adipamide), nylon 11, nylon 12, nylon 66 (polymerized epsilon caprolactam), as well as copolymers of the aforesaid nylons, and the like.

The resulting reinforced assembly is heated to an elevated temperature that is, to a temperature of about 150°F or higher thereby causing solvation of the polyamide tubing. When the reinforcing material is nylon, a chemical bond is created; where the reinforcing material is a fiber other than nylon, an encapsulation is developed in the fiber resulting in excellent adherence to the polyamide or nylon tubing.

It has been found that a solution containing 50% resorcinol and 50% ethanol or methanol, by weight, will deposit a coating of about 1.5 mils (0.0015 inch) on the surface of the polyamide tubing. It has also been established that a solution of 30 parts by weight methanol and 40 parts by weight resorcinol produces a coating of resorcinol on the tubing of about 2.0 mils (0.002 inch) thick.

An alternative procedure that can be used involves passing a dry mixture of the polyamide such as, for example, nylon 11, and crystalline resorcinol through an extruder whereby a thin film of the material covers the polyamide or nylon tubing. After this coating has solidified as, by cooling, the reinforcing material can be applied over the outside diameter of the coating and the resulting assembly is then passed through a heating chamber. This results in softening of the coating thereby allowing it to encapsulate the natural or synthetic fiber. The coating will also solvate the polyamide such as, for example, the nylon 11 inner core and produce a chemical bond. A suitable mixture of resorcinol and a polamide such as nylon 11, comprises 50% resorcinol and 50% nylon, by weight.

The present process of bonding is far superior to the procedures described in the aforesaid U.S. Pat. Nos. 2,977,839 and 3,682,201. The prior art procedures require solvation or plasticization of the tubing prior to the application of the fiber. Consequently, the nylon which is being solvated has a preference for resorcinol and there is a continually changing concentration of the solvating bath making it extremely difficult to control the process. However, the present process is characterized by the fact and distinguishable from the prior art procedures described above in that substantially no solvation occurs prior to the application of the natural or synthetic fiber to the polyamide tubing. Consequently, the concentration of the bath remains constant and as a result, there is deposited on the polyamide tubing a uniform thickness of resorcinol. Another advantage characterizing the present process is that the resorcinol crystals cannot be pushed up into the interstices of the natural or synthetic fiber when they are applied and this is unlike the prior art procedures wherein the solvated surface is very pliable and is pushed up through the interstices of the fiber. This causes, in some cases, serious deterioration of the fiber through excessive solvation of the fiber especially when the fiber is nylon.

The invention is described in more detail in the following description of the drawings.

FIG. 1 illustrates the procedure for coating the outside diameter of the nylon tube with resorcinol crystals.

FIG. 2 illustrates the application of the finely ground crystalline resorcinol which adheres to the outside diameter of the braided structure when it is passed through a container of finely divided crystalline resorcinol.

FIG. 3 illustrates the formation of the crystals on the outside diameter of the nylon tubing and also an indication of how the finely ground crystalline resorcinol adheres to the outside of the braid. Wherein, the hose 1 is comprised of an inner core of nylon tubing 2 over which has been braided a synthetic cover 3 to which braid is bonded a thin nylon continuous covering 4.

The following Examples illustrate the preferred techniques for preparing reinforced tubing. Unless otherwise specified, all parts and percentages are given by weight and all temperatures are in degrees Fahrenheit.

EXAMPLE I

Continuous nylon 11 tubing one-fourth inch (I.D.) and five-sixteenths inch (O.D.) is quickly passed through a methanol bath which is approximately 12 inches in length. The exposure time in the passage of the tubing through the bath is about 15 seconds. The nylon tubing is then immersed for a period of 6–7 seconds in a bath 6 inches in length containing a solution of 50% by weight resorcinol and 50% by weight methanol, at room temperature. The treated tubing is then withdrawn vertically from the bath thereby obtaining an even coverage of resorcinol around the circumference of the tubing. The tubing is then subjected to warm air whereby a crystalline film of resorcinol is deposited on the outside diameter of the tubing.

There is then applied to the dried tubing a synthetic fiber such as nylon 66 by use of a 24 Carrier Wardwell Braiding Machine using 2400 denier film at 11 picks/inch to obtain a reinforced hosing material.

The hose thus obtained had a burst strength of about 5000 psi.

EXAMPLE II

The procedure of Example I was followed except that a rayon was applied to the nylon 11 tubing.

The resulting hose had a burst strength of about 5500 psi.

In applying the reinforcing material to the polyamide tubing, it may, at times, be desirable to apply more than one layer of the reinforcing material. This can be brought about by simply repeating the present procedure as described above. Specifically, the single layered reinforced tubing is contacted with a suitable resorcinol solution to obtain a coating of crystalline resorcinol thereon and this is followed by subjecting the reinforced tubing to an elevated temperature. Alternatively, a dry mixture of the polyamide and crystalline resorcinol is passed through an extruder thereby providing a thin film of resorcinol on the reinforced tubing or hose. This is followed by the application of heat to the reinforced tubing.

It is possible and at times desirable to apply to the single layered or multi-layered reinforced tubing or hosing, a suitable covering material such as a polyamide or a neoprene rubber. Such a covering is applied by using the technique herein described that is, contacting the reinforced tubing with a resorcinol solution so as to deposit on said reinforced tubing, a thin layer of resorcinol. Alternatively, the extrusion procedure described above can be used to obtain a polyamide tubing having a coating which is comprised of a mixture of polyamide and resorcinol. There is then applied to the tubing obtained by either of the above procedures, a polyamide covering or a neoprene covering and then subjecting this assembly to heating at an elevated temperature that is, at temperatures in excess of about 150°F so as to bond the cover onto the single or multi-layered reinforced tubins.

I claim:

1. A process for the preparation of a reinforced hose construction which comprises contacting a polyamide or copolyamide tubing with an aqueous resorcinol solution or an alcoholic resorcinol solution, drying said solution thereby forming a crystalline material on the surface of said tubing, applying to said tubing a layer of a synthetic or natural fiber followed by heating the reinforced tubing to a temperature of at least about 150°F.

2. A process according to claim 1 wherein the alcohol is an alkanol containing from 1 to 4 carbon atoms.

3. A process according to claim 1 wherein the resorcinol solution is a 1:1 mixture of resorcinol with methanol or ethanol, by weight.

4. A process according to claim 1 wherein the polyamide is a nylon 6, 11, 12, 66 or copolymers thereof.

5. A process according to claim 4 wherein the polyamide is nylon 11 or nylon 12.

6. A process according to claim 1 wherein the natural fiber is cotton and the synthetic fiber is a member selected from the group consisting of nylon 6, nylon 66, a polyester and rayon.

7. A process according to claim 6 wherein the polyester is poly(ethylene teraphthalate).

8. A process according to claim 1 wherein the polyamide or copolyamide tubing is treated with an alkanol containing from 1 to 4 carbon atoms prior to contacting with the resorcinol solution.

9. A process according to claim 1 wherein a mixture of the polyamide or copolyamide and resorcinol is extruded to obtain a thin coating on said polyamide or copolyamide tubing followed by applying the reinforcing synthetic or natural fiber to said tubing and then subjecting the resulting assembly to a temperature of at least about 150°F.

10. A process according to claim 1 wherein the reinforced product thus obtained is contacted with a resorcinol solution followed by applying at least one additional coating of a synthetic or natural fiber reinforcing material followed by subjecting the resulting assembly to a temperature of at least about 150°F.

11. The product obtained by the process of claim 1.
12. The product obtained by the process of claim 4.
13. The product obtained by the process of claim 9.
14. The product obtained by the process of claim 10.
15. A process according to claim 1 which comprises contacting the single or multi-layered reinforced tubing with a resorcinol solution, applying a covering selected from the group consisting of a polyamide, copolyamide or a neoprene on to said treated reinforced tubing followed by heating the resulting assembly at a temperature in excess of about 150°F.
16. The product obtained by the process of claim 15.
17. A process according to claim 11 wherein the reinforced product thus obtained is contacted with a coating comprising an extruded product of a polyamide or a copolyamide and resorcinol, followed by applying thereon at least one additional layer of a synthetic or natural fiber reinforcing material and then subjecting the resulting assembly to a temperature of at least about 150°F.
18. A process according to claim 11 which comprises contacting a single or multi-layered reinforced tubing with a coating comprising an extruded product of a polyamide or copolyamide and resorcinol, applying a covering selected from the group consisting of a polyamide, copolyamide or a neoprene on to said reinforced tubing followed by heating the resulting assembly at a temperature in excess of about 150°F.
19. The product obtained by the process of claim 17.
20. The product obtained by the process of claim 18.
21. A process according to claim 1 wherein the layer of the synthetic or natural fiber is applied by wrapping, braiding or helically winding around the treated tubing.
22. A process according to claim 9 wherein synthetic or natural fiber is applied to said tubing by wrapping, braiding or helically winding said fiber around said tubing.
23. A process according to claim 10 wherein the coating of said fiber is applied by wrapping, braiding or helically winding said fiber around the treated tubing.
24. A process according to claim 15 wherein said covering is applied by wrapping, braiding or helically winding said covering around said treated tubing.
25. A process according to claim 17 wherein said coating is applied by wrapping, braiding or helically winding said coating around said treated tubing.
26. A process according to claim 18 wherein said covering is applied by wrapping, braiding or helically winding said covering around said treated tubing.

* * * * *

UNITED STATES PATENT OFFICE
CERTIFICATE OF CORRECTION

Patent No. 3,861,973          Dated January 21, 1975

Inventor(s)          ROBERT B. KOCH

It is certified that error appears in the above-identified patent and that said Letters Patent are hereby corrected as shown below:

Column 1, line 30, cancel "the" (second occurrence).

Column 2, line 43, insert "a" before "warm air".

Column 4, line 10, cancel "." after "braid";

line 36, replace "film" by -- fiber --;

line 10, "Wherein" should read -- wherein --;

lines 36 and 37, "pick-s" should read -- picks --.

Claims 17 and 18, line 1, replace "11" by -- 9 --.

Signed and Sealed this thirtieth Day of September 1975

[SEAL]

Attest:

RUTH C. MASON
Attesting Officer

C. MARSHALL DANN
Commissioner of Patents and Trademarks